(12) United States Patent
Abegglen et al.

(10) Patent No.: US 9,481,507 B2
(45) Date of Patent: Nov. 1, 2016

(54) CAPSULE FOR THE PREPARATION OF A BEVERAGE IN BEVERAGE PRODUCTION DEVICE

(75) Inventors: Daniel Abegglen, Rances (CH); Arnaud Gerbaulet, Oye et Pallet (FR); Jean-Francois Tinembart, Yverdon (CH); Alexandre Perentes, Lausanne (CH)

(73) Assignee: Nestec S.A., Vevey (CH)

( * ) Notice: Subject to any disclaimer, the term of this patent is extended or adjusted under 35 U.S.C. 154(b) by 632 days.

(21) Appl. No.: 13/990,668

(22) PCT Filed: Nov. 25, 2011

(86) PCT No.: PCT/EP2011/071019
§ 371 (c)(1),
(2), (4) Date: May 30, 2013

(87) PCT Pub. No.: WO2012/072508
PCT Pub. Date: Jun. 7, 2012

(65) Prior Publication Data
US 2013/0259982 A1    Oct. 3, 2013

(30) Foreign Application Priority Data

Nov. 30, 2010 (EP) ..................... 10193112

(51) Int. Cl.
*B65D 85/804* (2006.01)
*A47J 31/22* (2006.01)

(52) U.S. Cl.
CPC ............ *B65D 85/8043* (2013.01); *A47J 31/22* (2013.01)

(58) Field of Classification Search
CPC ................................ B55D 85/8043
See application file for complete search history.

(56) References Cited

U.S. PATENT DOCUMENTS

| 2010/0173056 A1* | 7/2010 | Yoakim | A47J 31/22 426/433 |
| 2010/0178392 A1* | 7/2010 | Yoakim | A47J 31/0642 426/80 |

FOREIGN PATENT DOCUMENTS

| DE | 3529204 | 2/1987 |
| WO | 2008148604 | 12/2008 |
| WO | 2008148650 | 12/2008 |

OTHER PUBLICATIONS

DE 3529204 Barth et al. Aug. 1985, Machine translation.*

* cited by examiner

*Primary Examiner* — Erik Kashnikow
*Assistant Examiner* — Chaim Smith
(74) *Attorney, Agent, or Firm* — K&L Gates LLP

(57) ABSTRACT

Capsule designed in particular for the preparation of a beverage in a centrifugal brewing device by feeding liquid in the capsule and rotating the capsule along a central axis to produce centrifugal forces on the liquid traversing the capsule thereby forcing the beverage out of the capsule by such centrifugal forces, wherein the capsule comprises:—a body comprising containment walls, a main cavity of central axis,—a lid connected or connectable to said body and arranged for covering said cavity;—an annular flange peripherally bordering and protruding outwards beyond the said cavity, wherein the flange is configured to ensure one passage or a plurality of passages for providing flow of the centrifuged beverage in multiple radial directions from the cavity and through the flange or above the flange as a result of the centrifugation forces exerted when the capsule is rotated along said central axis.

11 Claims, 7 Drawing Sheets

CAPSULE FOR THE PREPARATION OF A BEVERAGE IN BEVERAGE PRODUCTION DEVICE

CROSS REFERENCE TO RELATED APPLICATIONS

The present application is a National Stage of International Application No. PCT/EP2011/071019, filed on Nov. 25, 2011, which claims priority to European Patent Application No. 10193112.9, filed Nov. 30, 2010, the entire contents of which are being incorporated herein by reference.

FIELD OF THE INVENTION

The present invention relates to the field of portioned beverage using capsules for preparing a beverage in a beverage brewing device. The invention more particularly relates to an improved capsule and a method for preparing the beverage.

BACKGROUND ART

The preparation of a beverage by a capsule containing beverage ingredients is known. In general, the capsule is inserted in a beverage production device, such as a coffee machine, liquid is fed in the capsule, the liquid interacts with the beverage ingredients and a beverage is extracted from the capsule under pressure or by gravity.

The preparation of a beverage by using the centrifugation is known. The principle mainly consists in providing beverage ingredients in a container of the capsule, feeding liquid in the receptacle and rotating the receptacle at elevated speed to ensure interaction of liquid with ingredients while creating a gradient of pressure of liquid in the receptacle; such pressure increasing gradually from the centre towards the periphery of the receptacle. As liquid traverses the ingredients, e.g., ground coffee, the extraction of the beverage compounds takes place and a liquid extract is obtained that flows out at the periphery of the receptacle.

The term "capsule" refers in general to any flexible, rigid or semi-rigid packaging container containing beverage ingredients. Other synonyms to a capsule are: "pod", "pad", "cartridge" or "sachet". The capsule can be designed for a single use. The container can also be filled with ingredients by the user to form the capsule just before use.

The term "ingredients" means any suitable beverage substance such as ground coffee, soluble coffee, leaf tea, soluble tea, herbal tea, dairy powder, culinary powder, baby food, other beverage nutritional ingredients and any combinations thereof.

A capsule system and method for preparing a beverage from a capsule using centrifugation forces is described in the following documents: EP2210539, WO2008/148604, WO2008148650, WO2008/148646, WO2008/148656 and WO2010/026045.

It is known to use a capsule in a beverage brewing device using centrifugation wherein a closure wall of the capsule is removed or perforated for enabling insertion of a liquid injection means and/or beverage extracting means.

In particular, in the international patent application WO2008/148646, a capsule intended for being used in a centrifugation device is described which has a body with a cavity, a lid closing the cavity and a flange; such flange being engaged by a valve means of the beverage production device. The lid has openings or pores at its periphery for enabling the flow of centrifuged beverage to leave the cavity. The flow then passes on the upper surface of the flange and between the valve means when a passage is created by a relative movement between the valve means and the flange of the capsule. In the international patent application WO2010/066705, a capsule is also intended for being used in a centrifugation device. The capsule comprises a flange with an annular raising portion forming a restriction for the centrifuged liquid flow path when said portion is engaged by a pressing surface of the beverage production device.

Therefore, the flow and the pressure created in the capsule highly depend on the characteristics of the valve means and the shape and dimensions of the flange.

SUMMARY OF THE INVENTION

The object of the present invention is to propose a capsule intended for being used in a centrifugation device wherein the flow of liquid in the capsule is well controlled, in particular, for providing a good interaction of the liquid with the beverage ingredients contained in the capsule.

Another object of the invention is to propose a capsule that can be used in different beverage preparation devices, such as in a device comprising a flow restriction valve and in other devices without such flow restriction valve. As a result, the capsule is more versatile for use in various beverage preparation devices.

For this, the invention relates to a capsule designed in particular for the preparation of a beverage in a centrifugal brewing device by feeding liquid in the capsule and rotating the capsule along a central axis (I) to produce centrifugal forces on the liquid traversing the capsule thereby forcing the beverage out of the capsule by such centrifugal forces, wherein the capsule comprises:
  a body comprising containment walls forming a main cavity of central axis (I),
  a lid connected or connectable to said body and arranged for covering said cavity,
  an annular flange peripherally bordering and protruding outwards beyond the said cavity,
  wherein the flange is configured to ensure one passage or a plurality of passages for providing flow of the centrifuged beverage in multiple radial directions from the cavity and through the flange or above the flange as a result of the centrifugation forces exerted when the capsule is rotated along said central axis.

In a mode, protrusions and/or channels are provided which are distributed circumferentially at the annular flange to form the plurality of passages. Preferably, a multitude of protrusions are distributed at the flange which extends radially to delimit a multitude of flow channels in-between. Such protrusions may be engaged by a surface of the beverage production device to delimit at the flow channels, a multitude of through-openings of predefined opening surface area. The total opening surface area thereby forms the passage surface for the beverage flow and can regulate, as a function of the rotational speed of the capsule, the flow conditions (e.g., flow rate and pressure gradient) during the centrifugation.

In this mode, the lid of the capsule may have a transversal wall including through-openings for enabling the beverage to travels through and above the upper surface of the lid and above the upper surface of the flange during beverage extraction by centrifugation. In this case, protrusions and/or channels are present on the upper surface of the flange. Preferably, the lid comprises substantially no opening in the region of the lid between the through-openings and the central axis; such region being of a longer radial distance than the radial distance separating the openings from the flange.

In an alternative mode, the lid has a transversal wall including no through-openings in the vicinity of its periphery to prevent beverage from passing above the flange. In this case, the flange is configured to leave at least one passage delimited between the lid and the body for the flow of centrifuged beverage. In this mode, the lid may comprise an upper portion of flange adjacent a lower portion of flange of the body; said upper and/or lower portion of flange being flexible upon a relative pressure of liquid being exerted during centrifugation, to leave said at least one beverage flow passage through the flange.

Furthermore, the lid may comprise an upper portion of flange which is placed adjacent a lower portion of flange of the body at an interface area of the flange; said upper and/or lower portions of flange comprising protrusions and/or channels at said interface area. As a result, the beverage flow is capable of traversing the flange through the channels or voids created between protrusions provided at said interface area. A control of the flow characteristics is thereby also made possible.

For all the possible modes, a filter may be provided upstream and downstream of the said passage or passages. Preferably, the filter is provided between the lid and the cavity or, alternatively, above the lid. The filter can be sealed at the flange and/or to the lid.

The filter is designed to ensure no significant leakage of ingredient particles such as coffee particles. The filter is more particularly designed to retain particles of a size larger than 100 microns in the cavity. The filter may be made of: paper, a natural and/or synthetic fabric (woven, non woven) and/or porous polymers and combinations thereof. More particularly, the material for the filter can be PU, PP, PA, PE, PET, PLA, starch, cellulose and combinations thereof.

The lid can comprise a recess lowered and inwards relative to the flange and directed towards the cavity. The recess can be provided to prevent the lid from being perforated by outlet perforating means or extraction means present in the device. Such perforating or extraction means may be necessary for perforating a sealing foil provided on a different capsule or on the capsule of the invention, if the capsule comprises such sealing foil. More preferably, the recess extends along an annular area above the cavity and is closer to the flange than to the central axis "I". Such positioning corresponds to the possible presence of perforating means of the device. For example, the annular recess can be U-shaped when seen in transversal cross-section of the lid.

The lid may also comprise an opening or a zone of reduced thickness located in the central axis "I". Such zone is dedicated for allowing the introduction of a liquid injector or feeding a liquid in the cavity (such as from an outside liquid feed system). For example, a zone of reduced thickness enables an easy perforation of the lid to create an opening such as by a rigid elongated injector.

The capsule may, in particular, contain beverage ingredients chosen amongst: ground coffee, soluble coffee, leaf tea, herbal tea, soluble tea, milk powder, cocoa powder, infant formula, culinary powder and combinations thereof. In a preferred example, the capsule contains between 4 and 20 grams of ground coffee powder depending on the volume of the cavity that may be sized accordingly. The amount of ground coffee may be adjusted to the desired beverage volume and/or the desired strength of the coffee beverage.

The lid may be fixedly or removably attached to the body. A removably attached lid may offer the possibility to remove the solid residues after extraction such as the used coffee powder.

The lid may be a part separate from the body or linked to the body by a flexible linkage to enable the association of the lid to the body just after a user has filled the cavity with beverage ingredients. The user may be the consumer who fills the capsule and closes the lid on the body.

The present invention also relates to a method for preparing a beverage by use of a capsule as aforementioned, in a centrifugal beverage preparation device comprising:
 feeding liquid in the cavity of the capsule,
 rotating the capsule along the central axis (I) of the capsule to produce centrifugal forces on the liquid traversing the capsule thereby forcing the beverage out of the capsule by such centrifugal forces,
 wherein it comprises transferring the beverage from the cavity and through or above the flange via said passage or plurality of passages.

BRIEF DESCRIPTION OF THE DRAWINGS

Additional features of the invention will appear in the detailed description of the figures which follows.

DETAILED DESCRIPTION OF THE DRAWINGS

Figure 1:
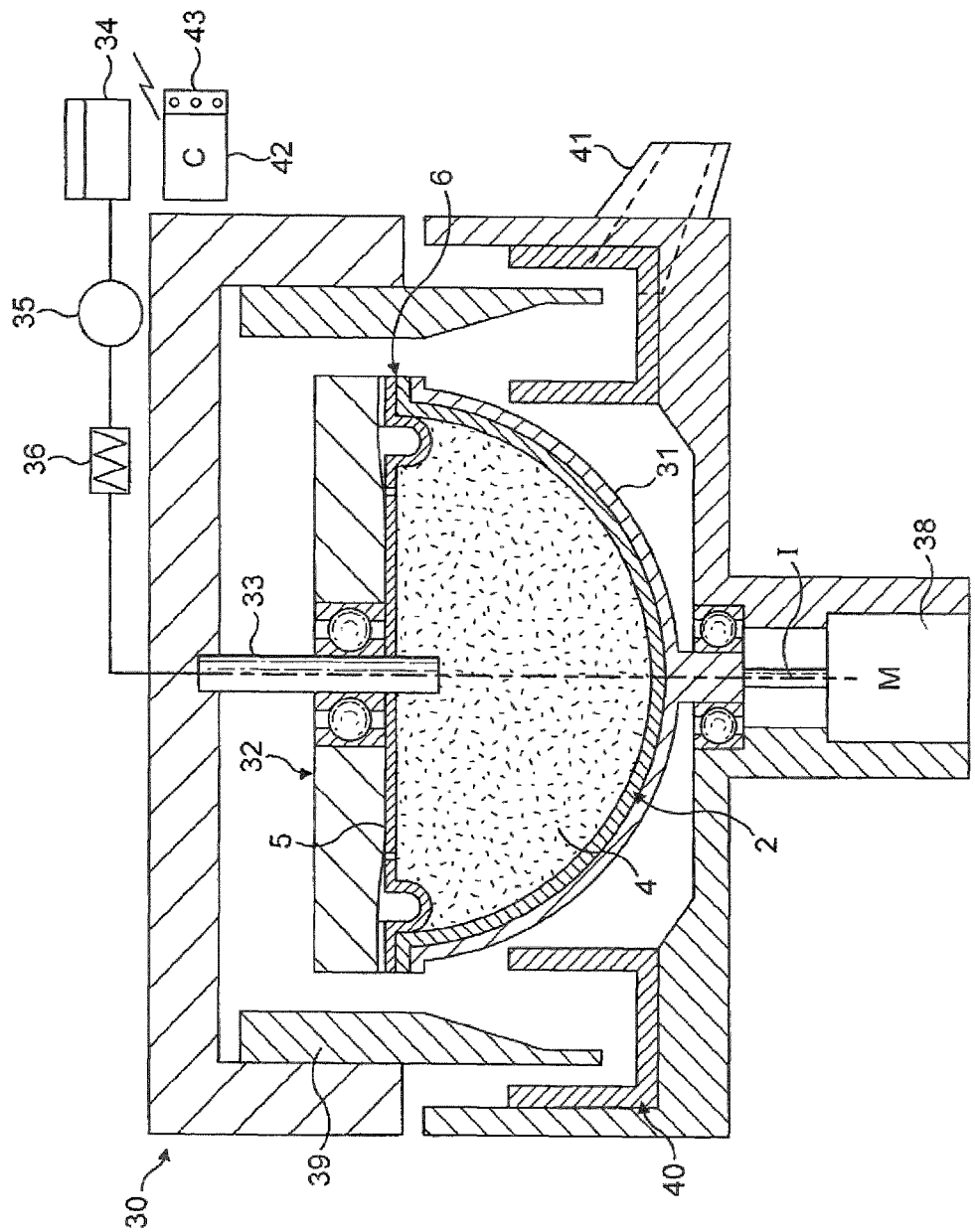
FIG. 1 shows a cross sectional view of a beverage preparation system comprising a capsule of the invention inserted in a beverage preparation device.
Figure 2:
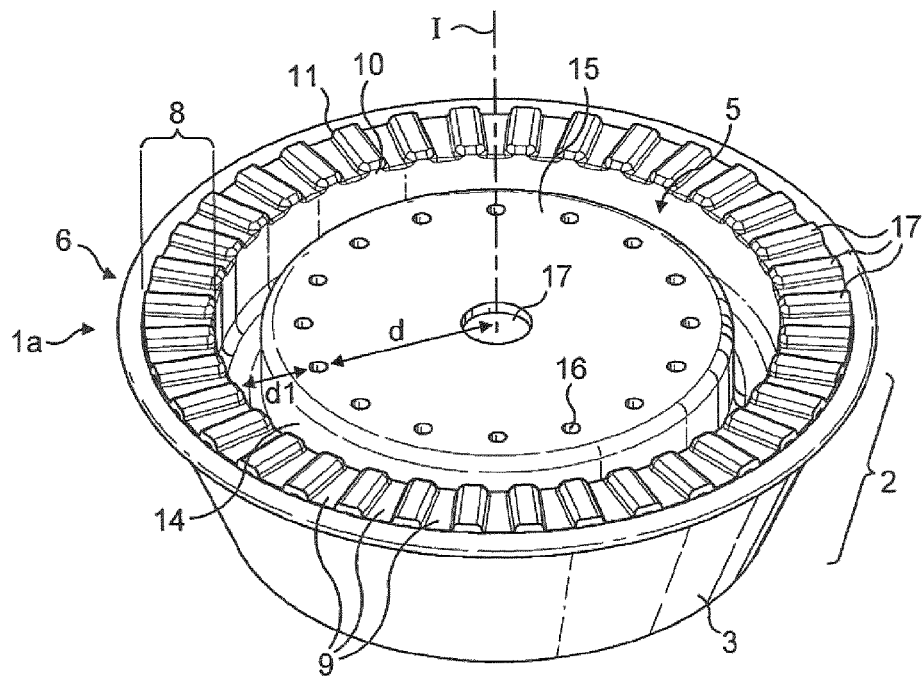
FIG. 2 shows a perspective view of a capsule of the invention according to a first embodiment.
Figure 3:
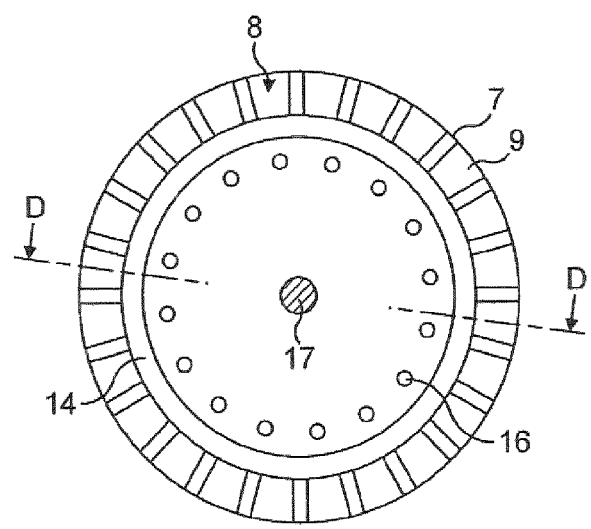
FIG. 3 shows a top view of the capsule of FIG. 2.
Figure 8:
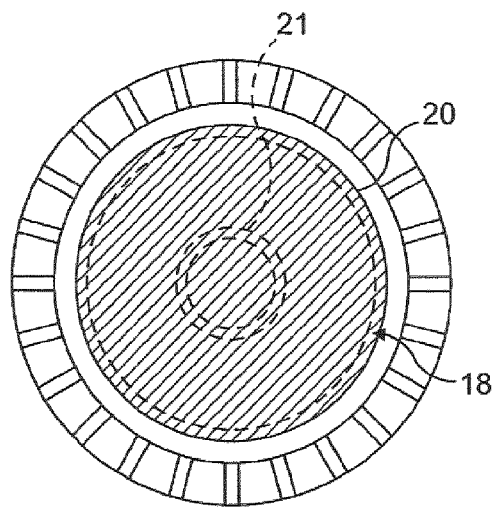
FIG. 8 shows a bottom view of the capsules of FIG. 2, 3, 4, 5 or 6.

A first embodiment of the capsule of the invention is illustrated in FIGS. 2, 3 and 8. A capsule according to this embodiment in a beverage preparation device designed for driving the capsule in centrifugation is also illustrated in FIG. 1 and is also illustrated in an enlarged and detailed view in FIG. 4. These FIGS. 1, 2, 3, 4 and 8 will serve for the purpose of the description of this first embodiment.

The capsule 1A according to this first mode comprises a body 2 having containment walls 3 delimiting an internal open cavity 4. The body can be generally cup-shaped. It can take various shapes such as a trunk of cone or a convex basin, etc. The cavity 4 extends in an axial direction "I" passing through its centre and from the opening end of the body to the bottom end of the body. The containment walls of the body may form a symmetry of revolution around axis "I" to avoid the unbalance of mass distribution which would otherwise cause vibrations and/or noises during rotation. However, such symmetrical shape of the capsule is not mandatory for the invention.

Figure 4:
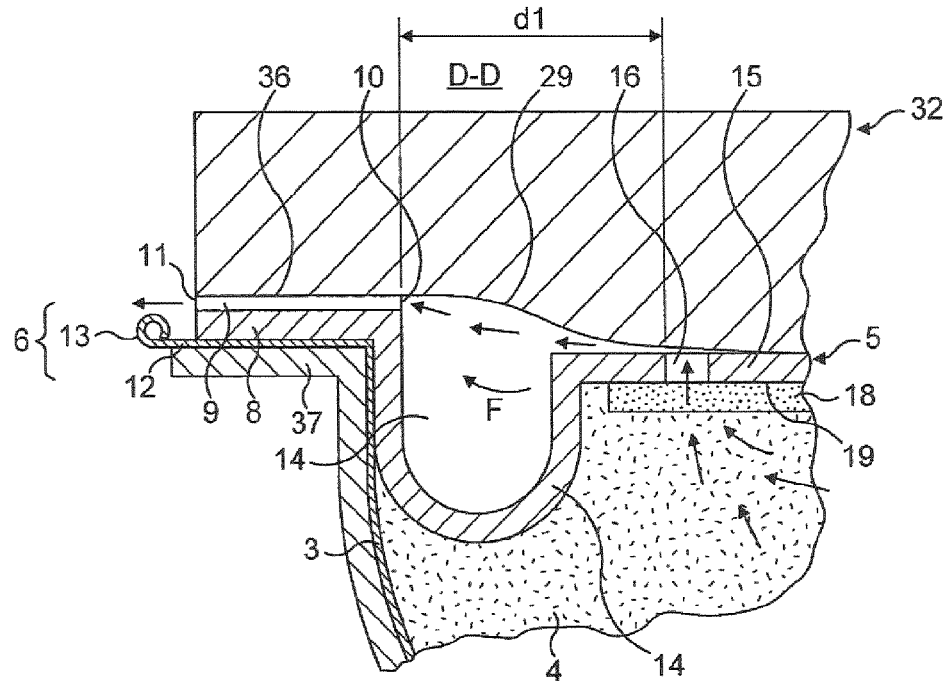
FIG. 4 shows a detail cross-section view along D-D of the capsule of FIG. 3 during beverage extraction in the device of FIG. 1.

The capsule further comprises a lid 5 arranged for covering the cavity of the body. The cavity is thus filled with beverage ingredients such as ground coffee powder. The lid and body are connected at a flange 6 which extends peripherally beyond the containment walls. According to an aspect of the invention, the flange 6 is arranged to provide passages for the flow of the centrifuged beverage; such passages extending radially across and above the flange 6. For this, the lid comprises a series of upper protrusions 7 in the form of rectilinear ridges which are distributed radially and circumferentially along an annular portion of flange 8 of the lid. Two neighbouring protrusions 7 thereby delimit a groove or channel 9 also extending radially above the portion of flange 8. The upper protrusions and upper channels can form an embossing on the portion of flange such that the lower surface of the portion of flange 8 is also formed of lower channels straight below the upper protrusions and of lower protrusions straight below the upper channels. It should be noticed that the protrusions and channels are not necessarily rectilinear but may take various shapes such as elliptical, labyrinth or zig-zag-shapes. The protrusions may, for instance, be formed by a series of knurls or ridges provided along the circumference of the flange; such knurls or ridges being oriented radially. The protrusions may also be formed as a series of small studs protruding from the flange but occupying only a part of the radial width of the flange. However, it should be ensured that the passages for the flow are provided throughout the radial width of the flange, i.e., the passages traversing from the inner edge 10 to the outer edge 11 of the uppermost surface of the flange. As shown in FIG. 4, the upper portion of flange 8 is connected to a portion of flange 12 which belongs to the body and extends as an integral part of the containment walls 3. This lower portion of the flange 12 may extend beyond the upper portion of flange 8 of the lid and may possibly end by a curled or enlarged end 13. The connection between the two portions of flange 8, 12 may be obtained by an adhesive and processed, for example, by heat welding or ultrasonic sealing.

The lid of the capsule 1A preferably comprises a recess 14 neighbouring the flange or distanced from it by a distance, for example, comprised between 0 and 5 mm. The recess is lowered relative to the flange, in particular, the portion of flange 8. The recess may be annular to delimit, in elevation above the recess, a central portion 15 of the lid. The recess is preferably of a depth comprised between 1 and 10 mm, more preferably 3-8 mm. A longer depth can be envisaged but could create zones where the ingredients may be trapped between the lid and the containment walls of the body. Also, it would start to significantly reduce the available volume for the ingredients in the capsule.

The central portion also comprises through-openings 16 to allow the beverage or liquid extract to traverse the lid from the cavity to the external surface of the lid 5 under the effect of the centrifugal forces when the capsule is rotated around axis "I". The number of openings may vary but it is preferred to envisage a sufficient number of openings distributed circumferentially on the lid. For instance, between 5 and 50 openings can be provided. The through-openings 16 are preferably provided at a certain distance "d" from the central axis "I", more preferably, at a distance "d1" from the innermost edge 10 of flange 6 smaller than the distance "d".

Between the central axis "I" and these openings, the lid is preferably free of openings to ensure a better guidance to the liquid and to avoid bypass of liquid out of the capsule. Such distance can be, for instance, comprised between 0 and 20 mm, preferably between 1 and 10 mm. The openings 16 could also be provided in the recess 14 itself. If the openings are placed too close to the central axis "I", the liquid tends to leave the capsule too early and bypasses portions of ingredients which become insufficiently wetted. Therefore, in theory the closer the openings are to the flange 6, the better the interaction between the liquid and the ingredients.

The central portion may further comprise a central opening 17 enabling the passage of an injector of the beverage preparation device. Such central opening may be replaced by a breakable material area such as a pre-weakened area, for example, scorings or pre-scorings delimiting an opening zone.

The capsule 1A further comprises a filter 18 as illustrated in FIG. 8 which is positioned between the lid and the cavity of the body. For instance, the filter is sealed onto the inner surface 18 of the lid. The filter may be sized sufficiently large to cover the openings 16. The filter may, for instance, be circular and sealed by two sealing edges 20, 21 spaced circumferentially apart on the inner surface of the lid. It should also be noted that the filter could be made integral with the lid. In particular, the openings 16 could be made small enough to ensure the retention of the non-soluble or larger particles in the cavity during centrifugation. It should also be noted that the filter can be positioned on the upper surface 15 of the lid.

Figure 5:
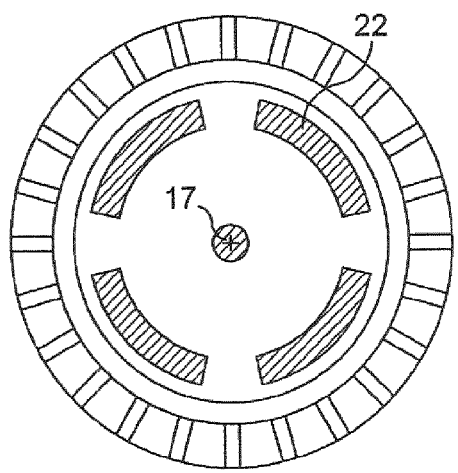
FIG. 5 shows a top view of a variant of the capsule of FIGS. 2 and 3.

FIG. 5 illustrates a simple variant of the capsule 1A in which the lid 5A comprises outlet openings 22 which are made much larger than the particle size of the ingredients such as a series of cut-outs extending along several portions of arc through the lid. The openings are also covered internally or externally by a filter. The operation of the capsule 1A in a centrifugal brewing device is now described in relation to FIGS. 1 and 4. The capsule is inserted in the device 30, in particular, in a rotationally mounted capsule holder 31 shaped and dimensioned for properly referencing the body 2 of the capsule 1A. A liquid interfacing member 32 is engaged relatively to the lid 5 of the capsule in such a manner to ensure sufficient liquid sealing contact at the liquid injection site of the capsule. The liquid interfacing member 32 and capsule holder 31 are moved relative to one another by any suitable actuation means (not described). In particular, a peripheral pinching part 36 of the liquid interfacing member engages with the flange 6 of the capsule in fixed (or alternatively spring-biased manner). The flange 6 of the capsule becomes pinched between such pinching part 36 and the support part 37 of the capsule holder. Since the protrusions and/or channels 7, 9 are present at the flange, radial passages can be maintained enabling the centrifuged beverage to release at the pinched flange, in particular, above the portion of flange 8 of the lid.

A central injector 33 is provided to traverse the central opening, eventually to break a pre-weakening area of the lid in the opening area. The injector 33 is fed with liquid, such as heated water, coming from a reservoir 34, a pump 35 and a heater 53.

For carrying out the beverage extraction, the capsule can be driven at high-speed rotation (e.g., between 500-10000 rpm), by means of a rotary motor 38 and liquid is fed in the capsule through the injector 33. As the capsule is rotated while being pinched by the capsule holder 31 and the engaging plate 32, the mass of beverage ingredients is compressed on the inner periphery of the containment walls and lid and liquid traverses the resulting compacted mass and interacts with the ingredients to form a beverage or liquid extract (FIG. 4). Such beverage finds its way through the holes 18 provided in the perforating wall and is projected in centrifugal flows "F" through the channels and against an impact wall 39 of the device. A certain annular clearance for the beverage can be provided between the openings 16 and the opposite surface of the engaging plate 32. Also, the recess 14 can participate to the formation of such clearance depending on the positioning of the openings relative to the recess (e.g., if such openings are provided in the recess). The engaging plate may also be formed with a recess or concave area 29 above the lid to leave such clearance. In the more central part of the lid, the engaging plate and/or injector may seal sufficiently with the lid to prevent a bypass of liquid from the central opening and between the lid and the engaging plate.

As shown in FIG. 1, the beverage is then collected in a collector 40 and drains through a beverage duct 41. The different parameters for controlling the extraction cycle, in particular, the rotational speed imparted by the motor 38 and the flow rate of the pump 35 can be regulated by a control unit 42. In the simplest mode, different extraction cycles can be programmed in the unit and the relevant programs can be triggered by a user interface 43.

Figure 6:
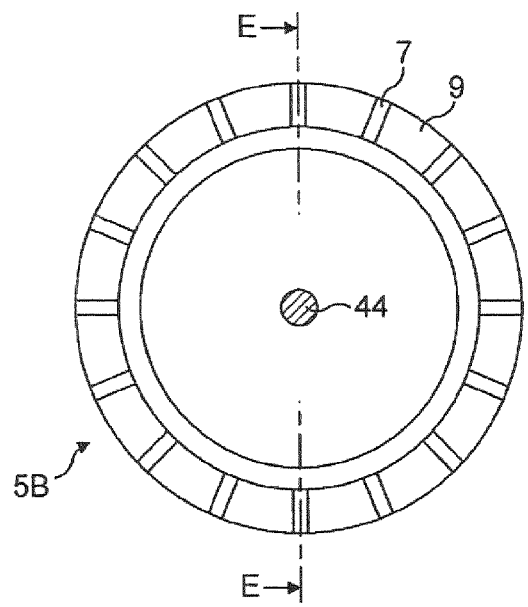
FIG. 6 shows a top view of a capsule according to a second embodiment.
Figure 9:
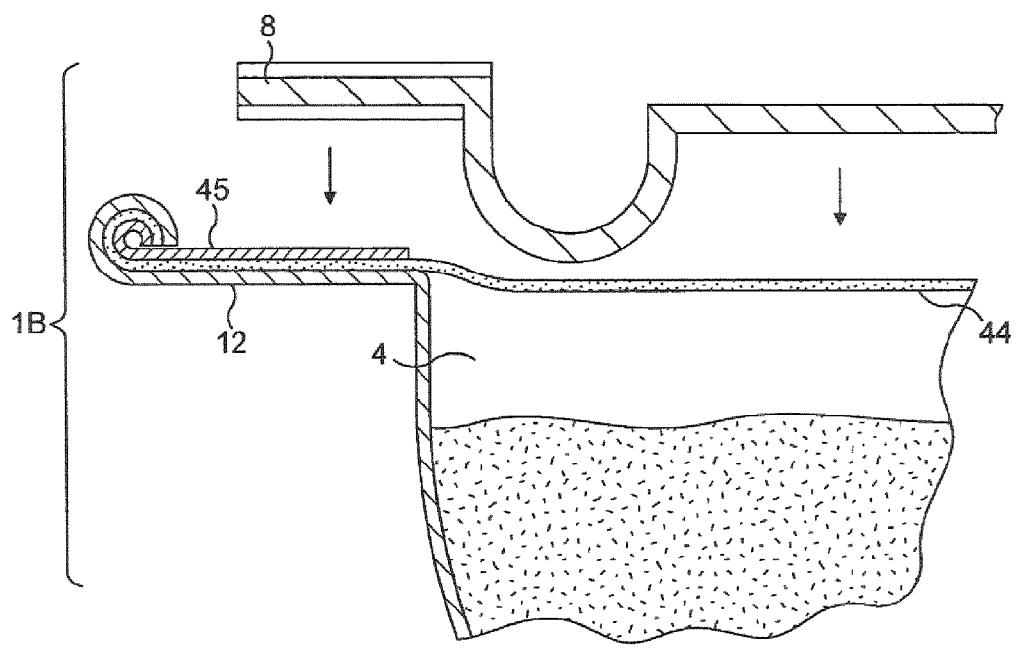
FIG. 9 shows a detailed cross section of the capsule of FIG. 6 before assembly of the lid onto the body.
Figure 10:
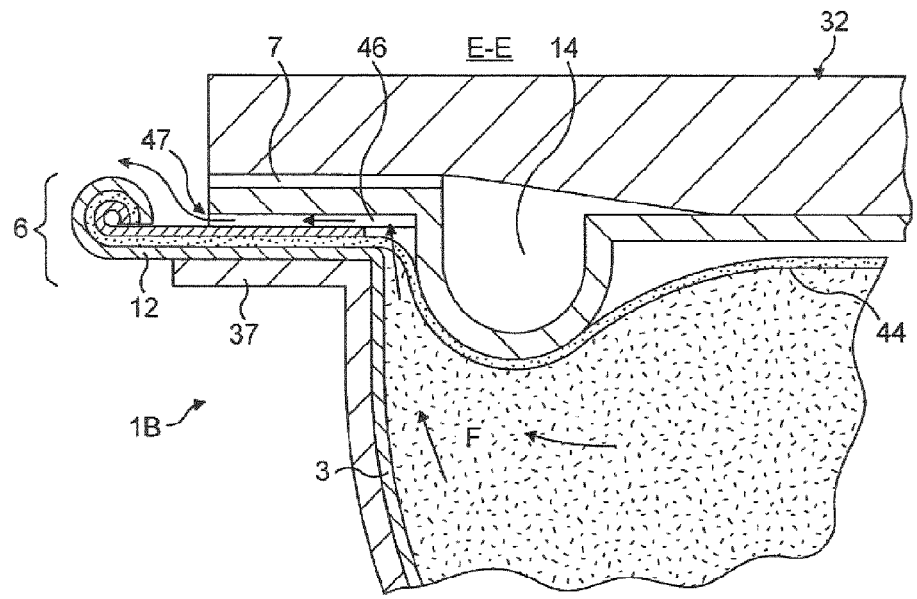
FIG. 10 shows a detailed cross-section view along plane E-E of the capsule of FIG. 6.

A second embodiment of capsule 1B is illustrated in relation to FIGS. 6, 9 and 10. Only the changes compared to capsule 1A are discussed considering that all the other aspects can be identical or equivalent. In the capsule 1B, the lid 5B is free of peripheral through-openings. A filter 44 is positioned between the cavity 4 and the lid. More particularly, the filter is sealed on the portion of flange 12 so that the full cavity is covered by the filter. The filter may be sealed between the portion 12 and a sealing insert 45 such as formed by an aluminium or plastic annular band. Adhesive layers are provided to properly fix the filter on the flange portion. The lid may be connected to the flange portion by its flange portion 8 such as by an adhesive layer. However a connection is not mandatory. The lid can also simply fit on the body without specific connection means making the capsule with a lid and body as separate elements (or just linked by a flexible joint) such as in the form of a "kit" for being filled by the user with beverage ingredients before insertion in the device.

The flange portion 8 of the lid is embossed so as to provide protrusions 7 and channels 9 on its upper surface and an opposite pattern of channels 46 and protrusions on the lower surface (FIG. 10). Of course, it can be possible to have only a pattern of channels and protrusions on the lower surface of the lid (i.e., the upper surface being flat in such case). When the upper portion of flange 8 fits on the lower portion of flange, at an interface area 12, through-passages are provided by virtue of the channels remaining open in their radial direction but closed in the axial direction.

FIG. 10 shows the extraction principle in such capsule 1B. The liquid is injected through the central opening of the capsule and traverses the mass of ingredients by virtue of the centrifugal forces. The direction of the flow is essentially towards the periphery, both outwards and upwards, as resulting from the widening shape of the containment walls and the exerted forces. The liquid can thus flows through the filter 44, in its peripheral area, close to the flange 6, and leaves the capsule through the multitude of channels 46 provided in the flange's interface area 47 between the portion of flange 8 of the lid and the portion of flange 12 of the body.

Figure 7:
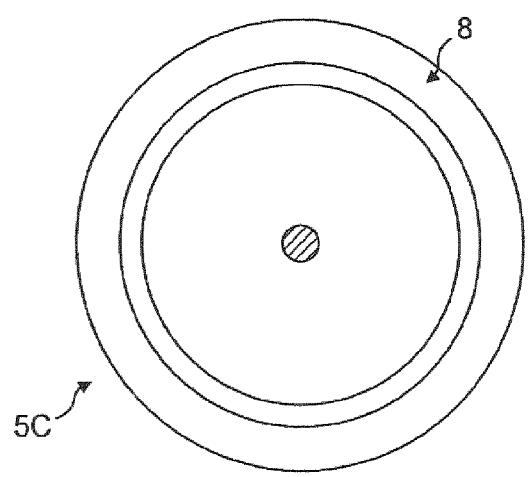
FIG. 7 shows a top view of a capsule according to a third embodiment.
Figure 11:
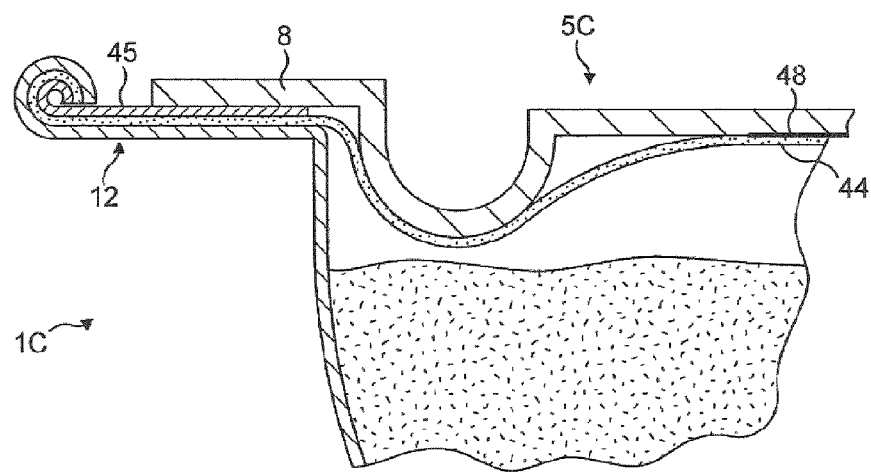
FIG. 11 shows a detailed cross-section view of the capsule of FIG. 7.
Figure 12:
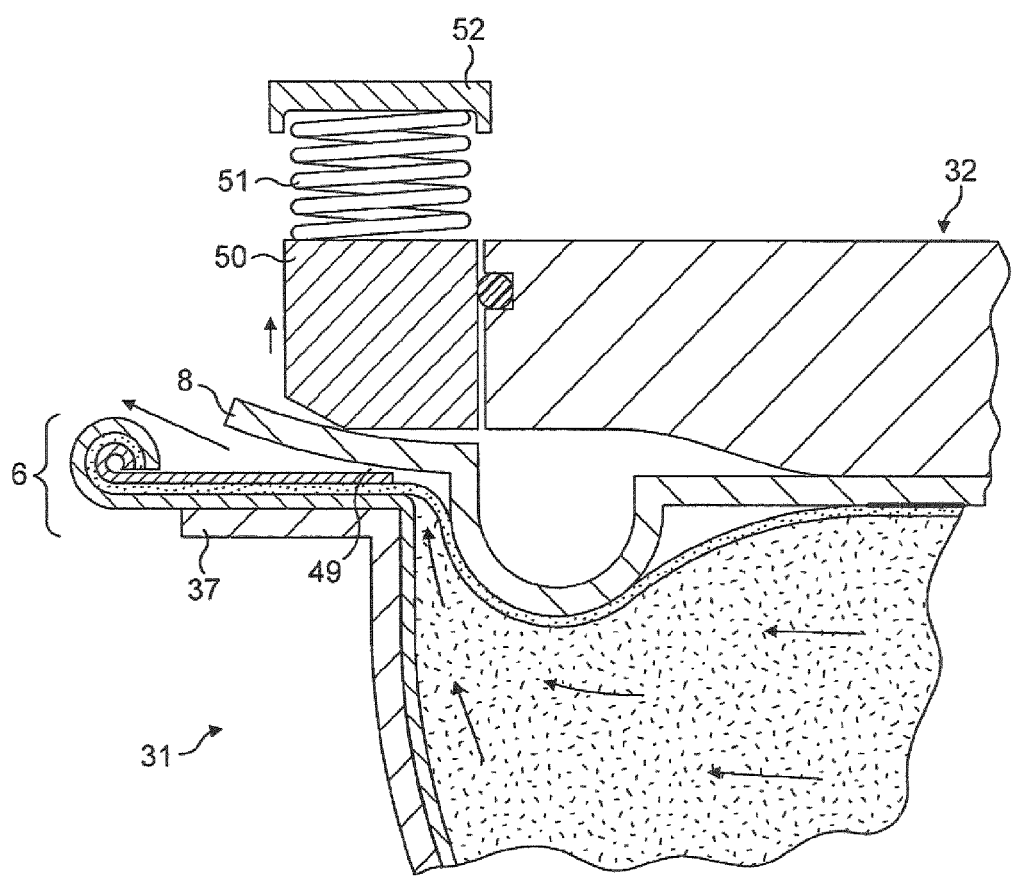
FIG. 12 shows a detailed cross-section of the capsule of FIG. 11 during beverage extraction.

FIGS. 7, 11 and 12 illustrate a further possible embodiment of capsule 1C of the invention. Again, the changes compared to capsule 1A are discussed considering that all the other aspects can be identical or equivalent. In the capsule 1C, the lid 5C has a flange portion 8 which is substantially free of significant protrusions or channels. The lid is also free of peripheral through-openings for liquid to traverse the lid as a result of the centrifugation forces. The capsule comprises a filter 44, similar to capsule 1B, which is sealed onto the portion of flange 12 of the body, for example between a sealing insert 45 and the portion 12. The lid 5C is sealed onto the filter 44 in a central area 48 such as by an adhesive. However, the flange portion 8 of the lid remains without binding or connection with the filter or flange portions 12, 45 of the body (FIG. 11).

As shown in FIG. 12, when the capsule 10 is driven in centrifugation in the beverage preparation device, the free portion of flange 8 can be forced upwards to flex under the pressure of the centrifuged liquid flow. As a result, a circumferential passage 49 is created between the body and the lid at the flange 6. In order for the portion of flange 8 to bend, the engaging plate comprises an annular moving part 50. The part 50 is thus pushed by the lid portion 8 under the pressure of liquid. The part 50 returns to its initial position after beverage extraction by means of a spring biasing assembly 51, 52. It should be noticed that the magnitude of the flexure of the flange portion 8 may be exaggerated on the drawings for clarity purpose. The total opening surface of the clearance or passage 49 for enabling the ejection of the beverage out of the capsule by centrifugation may be in the order of 0.5-10 mm$^2$. Of course, such clearance may vary as a function of the rotational speed.

The invention claimed is:

1. A capsule for the preparation of a beverage in a centrifugal brewing device by feeding liquid in the capsule and rotating the capsule along a central axis to produce centrifugal forces on the liquid traversing the capsule thereby forcing the beverage out of the capsule by the centrifugal forces, the capsule comprising:
    a body comprising containment walls forming a main cavity of the central axis;
    a lid connected or connectable to the body and arranged for covering the cavity;
    an annular flange peripherally bordering and protruding outwards beyond the cavity,
    the annular flange is configured to ensure at least one passage for providing a flow of the beverage in multiple radial directions from the cavity and through the annular flange or above the annular flange as a result of the centrifugation forces exerted when the capsule is rotated along the central axis; and
    channels distributed radially at the annular flange to form the at least one passage,
    the lid has a transversal wall including peripheral through-openings configured to enable the beverage to travel through and above an upper surface of the lid and above an upper surface of the annular flange during beverage extraction by centrifugation, and protrusions and/or the channels are present on the upper surface of the annular flange.

2. The capsule according to claim 1, wherein the lid comprises substantially no opening in a region of the lid between the peripheral through-openings and the central axis, the region being of a longer radial distance than a radial distance separating the peripheral through-openings from the annular flange.

3. The capsule according to claim 1, wherein a filter is provided upstream of the at least one passage.

4. The capsule according to claim 3, wherein the filter is sealed at the annular flange.

5. The capsule according to claim 3, wherein the filter is sealed to the lid.

6. The capsule according to claim 1, wherein the lid comprises a recess lowered and inwards relative to the annular flange and directed towards the cavity.

7. The capsule according to claim 6, wherein the recess extends along an annular area above the cavity and closer to the annular flange than to the central axis.

8. The capsule according to claim 7, wherein the recess of the lid has a U-shaped transversal cross-section.

9. The capsule according to claim 1, wherein the lid comprises an opening or a zone of reduced thickness located in the central axis.

10. The capsule according to claim 1, further comprising beverage ingredients selected from the group consisting of ground coffee, soluble coffee, leaf tea, herbal tea, soluble tea, milk powder, cocoa powder, infant formula, culinary powder and combinations thereof.

11. The capsule according to claim 1, wherein the lid is removably attached to the body.

\* \* \* \* \*